United States Patent [19]
Scott

[11] Patent Number: 6,068,070
[45] Date of Patent: May 30, 2000

[54] DIAMOND ENHANCED BEARING FOR EARTH-BORING BIT

[75] Inventor: Danny Eugene Scott, Montgomery, Tex.

[73] Assignee: Baker Hughes Incorporated, Houston, Tex.

[21] Appl. No.: 08/923,009

[22] Filed: Sep. 3, 1997

[51] Int. Cl.[7] .................................................. E21B 10/46
[52] U.S. Cl. .......................................... 175/428; 175/434
[58] Field of Search .................................. 175/434, 428, 175/432, 425, 435; 264/81

[56] References Cited

U.S. PATENT DOCUMENTS

| | | | |
|---|---|---|---|
| 4,190,301 | 2/1980 | Lachonius et al. | 308/8.2 |
| 4,260,203 | 4/1981 | Garner | 308/8.2 |
| 4,738,322 | 4/1988 | Hall et al. | 175/329 |
| 4,756,631 | 7/1988 | Jones | 384/95 |
| 4,789,251 | 12/1988 | McPherson et al. | |
| 4,960,643 | 10/1990 | Lemelson | |
| 4,976,324 | 12/1990 | Tibbitts | 175/329 |
| 5,067,826 | 11/1991 | Lemelson | 384/492 |
| 5,137,398 | 8/1992 | Omori et al. | 408/145 |
| 5,183,529 | 2/1993 | Potter et al. | 156/613 |
| 5,264,071 | 11/1993 | Anthony et al. | 156/612 |
| 5,273,731 | 12/1993 | Anthony et al. | 423/446 |
| 5,279,375 | 1/1994 | Tibbitts et al. | 175/428 |
| 5,314,652 | 5/1994 | Simpson et al. | 264/81 |
| 5,337,844 | 8/1994 | Tibbitts | 175/434 |
| 5,349,922 | 9/1994 | Anthony et al. | 117/204 |
| 5,500,248 | 3/1996 | Iacovangelo et al. | 427/250 |
| 5,523,158 | 6/1996 | Kapoor et al. | 428/408 |
| 5,523,159 | 6/1996 | Kapoor et al. | 428/408 |
| 5,547,121 | 8/1996 | Kapoor et al. | 228/121 |
| 5,567,525 | 10/1996 | Kapoor et al. | 424/408 |

OTHER PUBLICATIONS

R.S. Sussmann, J.R. Brandon, G.A. Scarsbrook, C.G. Sweeney, T.J. Valentine, A.J. Whitehead and C.J.H. Wort; Properties of Bulk Polycrystalline CVD Diamond; Diamond and Related Materials, 3 (1994) 303–312.

J.M. Trombetta, J.T. Hoggins, P. Klocek, T.A. McKenna, L.P. Hehn, and J.J. Mecholsky, Jr.; Preliminary Measurements and Assessment of Strength and Fracture Toughness in Free Standing CVD Diamond for High Speed Missile Domes; Department of Materials Science and Engineering, SPIE Proceedings, vol. 1760, 1992.

C.Lai, Y.C. Wang, P. Lu, J.B. Wachtman Jr and G.H. Siegel, Jr.; Relation of Friction and Wear to Processing Parameters of Polycrystalline Diamond Films Grown on Silicon and Silica Substrates by the Hot Filament Method; Materials Science and Engineering, A183 (1994) 257–265.

S.J. Bull, P.R. Chalker, C. Johnston and V. Moore; The Effect of Roughness on the Friction and Wear of Diamond Thin Films; Surface and Coatings Technology 68–69 (1994) 603–610.

G. Paffenhoff GmbH & Co.; New Unit For Brazing Single–Crystal Diamond.

J. Michael Pinneo; A New Class of CVD Diamond Composite Materials for Cost–Sensitive, Large–Area Applications; Elsevier Science Publishers B.V., 1991.

Diamonex Diamond Coatings, Electronic and Optical Products.

Diamondex Incorporated Brochure; 1992.

Norton Company; Norton Introduces "White" CVD Diamond Wafers; Feb. 11, 1992.

(List continued on next page.)

*Primary Examiner*—Frank Tsay
*Attorney, Agent, or Firm*—James E. Bradley

[57] ABSTRACT

An earth-boring bit is formed having a bit body in a cantilevered bearing shaft that depends from the bit body. The bearing shaft is provided with a journal bearing surface. A cutter is mounted to the bearing shaft and has a mating bearing surface for engagement with the journal bearing surface of the bearing shaft. Provided on the bearing shaft is a layer of diamond film that is formed by chemical vapor deposition (CVD) as a free standing film. This layer of diamond film is brazed to the bearing shaft so that it forms the journal bearing surface. By utilizing the CVD methods of forming diamond film, the bearing surface can be formed in a variety of shapes and contours and with a surface texture or configuration as desired.

16 Claims, 3 Drawing Sheets

OTHER PUBLICATIONS

Norton Company; Norton Diamond Film: Leading a New Technology Into Commercial Applications.

Materials Engineering; Pure Diamond Available in Large Sizes; May 1992.
Norton Diamond Film; Cutting Tools; Apr. 1993.
CVD Diamond; Features and Benefits.

DIAMOND ENHANCED BEARING FOR EARTH-BORING BIT

BACKGROUND OF THE INVENTION

1. Field of the Invention

The present invention relates generally to earth-boring bits of the rolling cutter variety, and more particularly, to the bearing structures used in such bits.

2. Description of the Prior Art

The success of rotary drilling enabled the discovery of deep oil and gas reservoirs. The rotary rock bit was an important invention that made the success of rotary drilling possible. Only soft earthen formations could be penetrated commercially with the earlier drag bit, but the two cone rock bit, invented by Howard R. Hughes, U.S. Pat. No. 930,759, drilled the hard cap rock at the Spindletop Field, near Beaumont, Texas with relative ease. That venerable invention, within the first decade of the century, could drill a scant fraction of the depth and speed of the modern rotary rock bit. If the original Hughes bit drilled for hours, the modern bit drills for days. Modern bits sometimes drill for thousands of feet instead of merely a few feet. Many advances have contributed to the impressive improvement of earth boring its of the rolling cutter variety.

In drilling boreholes in earthen formations by the rotary method, earth-boring bits typically employ at least one rolling cone cutter, rotatably mounted thereon. The bit is secured to the lower end of a drill string that is rotated from the surface or by downhole motors. The cutters mounted on the bit roll and slide upon the bottom of the borehole as the drillstring is rotated, thereby engaging and disintegrating the formation material. The rolling cutters are provided with teeth that are forced to penetrate and gouge the bottom of the borehole by weight from the drill string. As the cutters roll and slide along the bottom of the borehole, the cutters, and the shafts on which they are rotatably mounted, are subjected to large static loads from the weight of the bit, and large transient or shock loads encountered as the cutters roll and slide along the uneven surface of the bottom of the borehole. Thus, most earth boring bits are provided with precision-formed journal bearings and bearing surfaces that are often hardened, such as through carburizing or hard facing, or provided with wear-resistant metal inlays. The bits are also typically provided with seal lubrication systems to increase the drilling life of the bits.

Despite advances in drill bit technology, improvements are still sought to increase the wear-resistance of bearing surfaces to thus increase the life of the drill bit. Super-hard materials, such as natural and synthetic diamond materials, have been used on cutting elements for drill bits for some time. The use of diamond materials for bearing surfaces has had less application, however. Polycrystalline diamond (PCD), for instance, has been used to increase the wear resistance of bearing surfaces in downhole tools. The PCD diamond material is usually formed at high pressure and temperature conditions under which the super-hard material is thermodynamically stable. This technique is conventional and known by those skilled in the art. For example, an insert may be made by forming a refractory metal container or can to the desired shape, and then filling the can with super-hard material powder to which a small amount of metal material (commonly cobalt, nickel, or iron) has been added. This may be capped with a cemented carbide blank or substrate. The container is then sealed to prevent any contamination. Next, the sealed can is surrounded by a pressure transmitting material, which is generally salt, boron nitride, graphite or similar material. This assembly is then loaded into a high-pressure and temperature cell. The design of the cell is dependent upon the type of high-pressure apparatus being used. The cell is compressed until the desired pressure is reached and then heat is supplied via a graphite-tube electric resistance heater. Temperatures in excess of 1350° C. and pressures in excess of 50 kilobars are common. At these conditions, the added metal is molten and acts as a reactive liquid phase to enhance sintering of the super-hard material. After a few minutes, the conditions are reduced to room temperature and pressure. The insert is then broken out of the cell and can be finished to final dimensions through grinding or shaping.

The main problem with these PCD materials is that the diamond formed using this method has limited shapes due to the constraints of the high temperature high pressure (HTHP) apparatus that is used. The PCD diamond used for bearing surfaces is thus formed as inserts that are mounted in holes formed in the bearing shaft. As a result, the PCD diamond may form only a portion of the bearing surface. One example of the use of PCD inserts is described in U.S. Pat. No. 4,738,322. The PCD materials are also very costly because of the small amounts that can be run in a HTHP cell. Use of the binder material also lowers the thermal limits of the insert and can increase the surface friction of the insert.

It therefore would be advantageous to provide a bearing structure for use in an earth-boring bit that has a durable, wear-resistant bearing surface formed of diamond that does not contain binders and can be formed into a variety of different shapes to effectively form a bearing surface.

SUMMARY OF THE INVENTION

An earth-boring bit is formed having a bit body from which a cantilevered bearing shaft depends that includes a shaft bearing surface. A cutter is mounted for rotation on the bearing shaft. The cutter includes a mating cutter bearing surface for engagement with the shaft bearing surface. At least a portion of the shaft bearing surface or the mating cutter bearing surface is formed from a free standing layer of diamond film. In a particularly preferred form of the invention, the free standing layer of diamond is formed by chemical vapor deposition. The diamond film is coupled to bearing shaft or cutter, thus forming at least a portion of the shaft bearing surface or the mating cutter bearing surface.

A method of forming the earth-boring bit is accomplished by first providing a bit body and a bearing shaft body. A cutter is also provided for rotatably mounting to the bearing shaft. In the preferred method, a free standing layer of diamond film is formed by chemical vapor deposition. This may be accomplished by forming the layer of diamond film on a substrate and then removing the diamond film from the substrate. The diamond film may then be coupled to the bearing shaft or to the mating cutter by means of brazing or soldering. In this way, the layer of diamond film forms a bearing surface for the bearing shaft or for the cutter.

Additional objects, features and advantages will be apparent in the written description which follows.

DETAILED DESCRIPTION OF THE INVENTION

Figure 1:
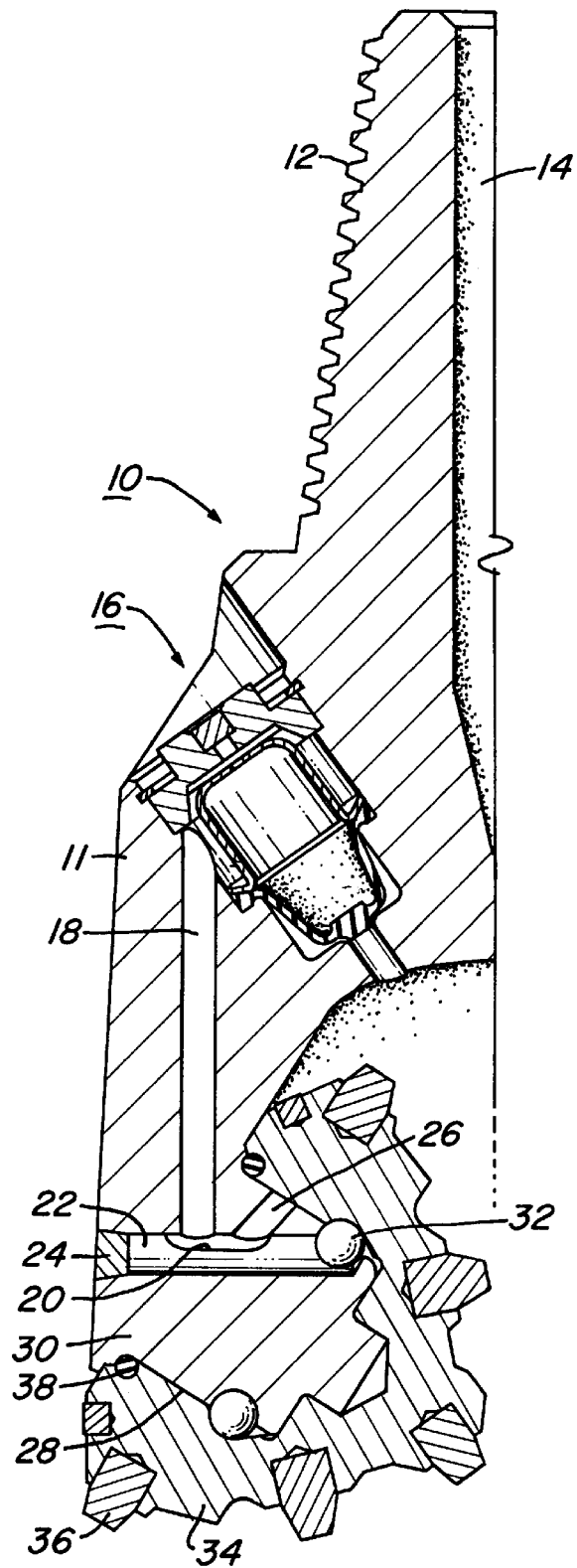
FIG. 1 is a longitudinal-section view of one section of a bit body of an earth-boring bit constructed in accordance with the invention.

Referring to the figures, FIG. 1 shows a section of an earth-boring bit 10. Although only one section is shown in FIG. 1, the bit 10 is usually formed as three sections that are welded together to form the composite bit 10. The earth-boring bit 10 has bit body 11 with a threaded upper portion 12 for connecting to a drill string member (not shown). A fluid passage 14 directs drilling fluid to a nozzle (not shown) that impinges drilling fluid against the borehole bottom to flush cuttings to the surface of the earth.

A pressure compensating lubrication system 16 is contained within each section of the bit 10. The lubrication system may be similar to that shown in U.S. Pat. No. 4,727,942. In each section of the bit body 11 is a lubrication passage 18 that extends downwardly into intersection with another lubrication passage 20 in the upper portion of a ball plug 22, which is secured to the body 11 by a plug weld 24. A third lubrication passage 26 carries lubricant to a bearing surface, designated generally at 28, of a bearing shaft 30, which is cantilevered downwardly and inwardly from an outer and lower region of the body 11 of the bit 10.

The ball plug 22 retains a series of ball bearings 32 that are rotatably secured to a cutter 34 and to the bearing shaft 30. Dispersed in the cutter 34 are a plurality of rows of earth disintegrating cutting elements or teeth 36 that are secured by interference fit in the mating holes of the cutter 34. An elastomeric O-ring seal 38 is received within a recess 40 formed in the journal bearing shaft 30 and cutter 34 at the base of the bearing shaft 30.

While the invention will be described with reference to the bearing structure of the journal bearing bit of FIG. 1, it will be understood that other rolling cone bit configurations are envisioned as well, including those featuring rigid face seal structures such as those shown in U.S. Pat. No. 4,516,641 to Burr; U.S. Pat. No. 4,666,001 to Burr; U.S. Pat. No. 4,753,304 to Kelly; and U.S. Pat. No. 4,923,020 to Kelly, all assigned to the assignee of the present invention. Commercially available bearing packages include, for example, metal sealed journal bearings, metal sealed roller bearings, O-ring sealed journal bearings and O-ring sealed ball and roller bearings, all of which are commercially available from Hughes Christensen Company, The Woodlands, Tex.

Figure 2:
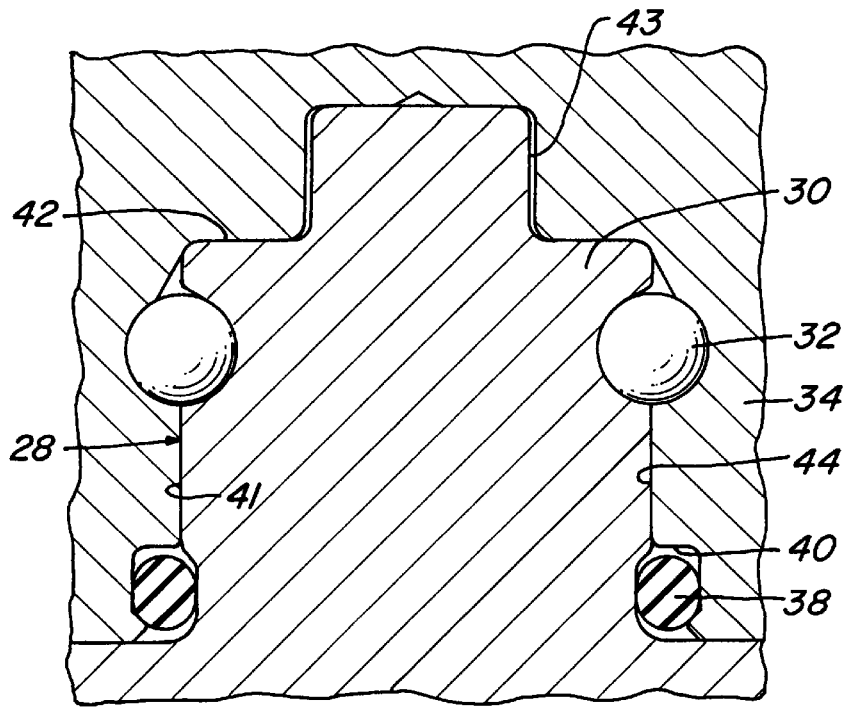
FIG. 2 is an enlarged, fragmentary longitudinal-section view of the bearing shaft and cutter of the earth-boring bit constructed in accordance with the invention.
Figure 3:
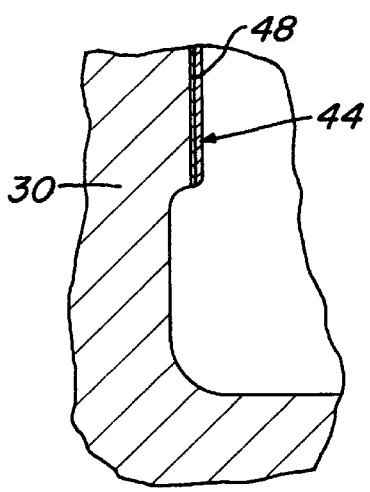
FIG. 3 is an enlarged, fragmentary longitudinal-section view of a mating surface of the cutter of FIG. 2.
Figure 4:
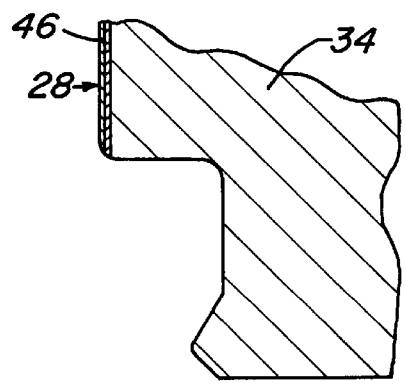
FIG. 4 is an enlarged, longitudinal-section view of the bearing shaft, showing the shaft bearing surface constructed in accordance with the invention.

As can be seen in FIG. 2, the journal bearing surface 28 of the bearing shaft 30 has a cylindrical bearing surface 41, a thrust bearing surface 42, and a pilot pin bearing surface 43. These surfaces 41, 42, 43 cooperate with and engage mating bearing surfaces, designated generally at 44, of the cutter 34. The journal bearing surfaces 41, 42, 43 of the bearing shaft 30 and mating bearing surface 44 of the cutter 34 are each formed from free standing layers of diamond film. The diamond film is joined to the bearing shaft 30 and cutter 34 by brazing or soldering alloy layers 46, 48, respectively (FIGS. 3 & 4).

Free standing layers of diamond film are commercially available from a number of sources including Diamonex Diamond Coatings of Allentown, Pa.; Norton Company's Diamond Film Division, Northboro, Mass.; and DeBeers Industrial Diamond Div., Ascot, U.K. Although the diamond films of the invention might be formed in various ways, the preferred manufacturing technique involves forming the diamond layers by chemical vapor deposition (CVD) techniques.

Various procedures have been developed to form diamond films by chemical vapor deposition and are generally well known. Such methods generally involve providing a mixture of a hydrocarbon gas, such as methane, and hydrogen gas that are activated at high temperatures in a controlled environment and directing them onto a substrate. Temperatures may range as low as 700 to 900° C. to well over 2000° C. Because of the high temperatures encountered in CVD, the substrate must have a high melting point above that required during the deposition process. The activated gases react to form elemental carbon, which is condensed as a polycrystalline diamond film upon the substrate. The deposition is carried out until the desired thickness of the film has been achieved on the substrate.

Once the diamond film is formed on the substrate, it can then be removed by physical or chemical methods. Physical release of the film from the substrate is usually accomplished by selecting a substrate having a different coefficient of thermal expansion than the diamond film. Cooling of the substrate thus causes the film to be released from the substrate. Alternatively, the substrate may be formed of materials that can be dissolved or etched away in an appropriate chemical compound. This may be preferable when the diamond films are formed on more intricate and complex-shaped substrates where release of the film by physical methods would be difficult or impossible.

Figure 5:
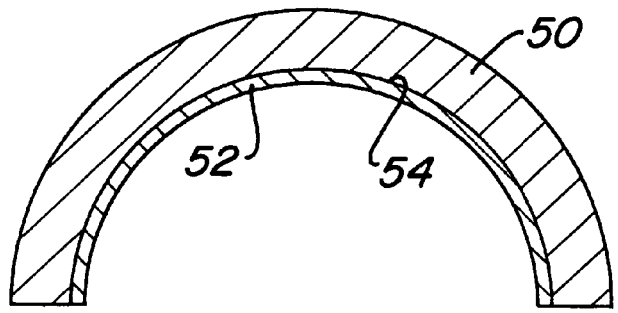
FIG. 5 is a transverse cross-sectional fragmentary view of a substrate and diamond film that is applied to the substrate when forming a bearing surface for the earth-boring bit in accordance with the invention.

The diamond film layer forming the bearing surfaces 28, 44 may vary in thickness, but typically will have a thickness between about 1 to 1,000 microns. Preferably the thickness is between 100 to 1000 microns. Because the diamond layer is formed as a film by chemical vapor deposition methods, it can be formed into a variety of shapes and with different surface configurations or textures. FIG. 5 shows a substrate 50 to which a CVD diamond film 52 has been formed. In this particular instance, the concave deposition surface of the substrate 50 has the inverse geometry from that of the bearing shaft 30. The diamond film 52 can also be provided with a desired surface configuration or texture by providing the substrate 50 with the inverse surface configuration. When the diamond film 52 is removed from the substrate 50, it will then carry the desired surface configuration or texture on the interfacing surface 54. In this way lubrication recesses, grooves or pockets can be economically formed in the surface of the film.

Once the diamond film is removed from the deposition substrate, it can then be applied to a bearing support surface of the bearing shaft 30 or cutter 34 by brazing or soldering. The high temperatures required in forming of the CVD diamond film generally preclude forming the film directly onto most bearing members used in down-hole tools. Brazing technology has been developed to allow brazing of these films directly to a substrate with a shear strength exceeding 50,000 psi. A brazing alloy is chosen that will wet both the diamond film and the underlying material of the bearing shaft or cutter. Suitable metals that have been used as brazing alloys include titanium, tantalum, zirconium, niobium, chromium and nickel. The brazing alloy must also have a melting temperature lower than the melting temperature of the underlying support structure to which the diamond film is brazed. The brazing alloys are positioned between the underlying support structure and the diamond film and the materials are heated sufficiently until the brazing alloy is melted and a joint forms between the diamond film and the body to which it is attached. Temperatures required for brazing are typically between 750 to 1200° C. The brazing is usually carried out in a high vacuum, preferably greater than $1 \times 10^{-5}$ Torr, or an oxygen-free inert gas environment to prevent carbon near the surface of the diamond from reacting with oxygen in the atmosphere to form carbon dioxide. The formation of carbon dioxide can prevent the brazing alloy from adhering to the diamond film and compromise the integrity of the bond between the diamond film and support structure.

The "DLA 2500" diamond brazing unit is commercially available from G. Paffenhoff GmbH of Remscheid, Germany, and can be used to braze diamond inserts to target substrates in an inert gas atmosphere.

Figure 6:
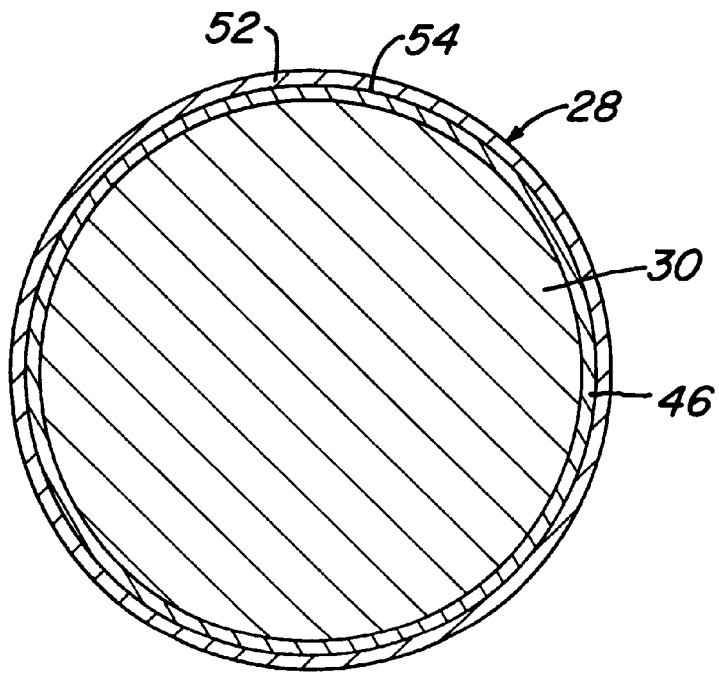
FIG. 6 is a transverse cross-sectional view of the bearing shaft, showing the shaft bearing surface constructed in accordance with the invention.

FIG. 6 shows the diamond film 52 formed on the substrate 50 (FIG. 5) providing the journal bearing surface 28 of the journal bearing shaft 30. The convex arcuate surface 54 of the diamond film 52 forms the outer surface of the bearing shaft 30, which engages the mating surface 44 of the cutter 34. The diamond film layer may form a generally continuous bearing surface of the bearing shaft 30 and cutter 34 so that the entire bearing surface is formed of the CVD diamond film, with no spaces or gaps. This may be accomplished by forming the diamond film in sections or segments, such as the section 52, that are applied and brazed to the underlying support surface with the sections of diamond film abutting one another in a close fitting relationship, as shown in FIG. 6. The film could also be set in recesses, such as grooves, slots or pockets, formed in the support structure and brazed or soldered therein.

Although the diamond layer is shown forming both the journal bearing surface 28 of the bearing shaft 30 and the bearing surface 44 of the cutter 34, it should be apparent to those skilled in the art that only one of the bearing surfaces of the journal shaft 30 or cutter 34 may be formed of CVD diamond film. In this way, different interfacing materials may be used, such as diamond/diamond, diamond/carbide, diamond/ceramic or diamond/metal.

CVD diamond film bearing surface of the invention has several advantages over the prior art. Because it is formed as a CVD layer, it may be formed with a variety of different geometries and surface finishes. The diamond film may form a continuous bearing surface or cover a much larger surface area than those diamond bearings utilizing diamond inserts formed from HTHP methods. Further, because the diamond film is formed from chemical vapor deposition, it does not contain cobalt or other materials which would otherwise limit or lower the thermal characteristics diamond material.

While the invention has been shown with respect to one particular embodiment, it should be apparent to those skilled in the art that it is not so limited but is susceptible to various changes without departing from the scope of the invention.

What is claimed is:

1. An earth-boring bit comprising:
a bit body;
a cantilevered bearing shaft depending from the bit body and including a journal bearing surface; and
a cutter mounted for rotation on the bearing shaft, the cutter including a mating bearing surface for engagement with the journal bearing surface of the bearing shaft; and wherein at least a portion of at least one of the journal bearing surface of the bearing shaft and the mating bearing surface of the cutter is formed from a free-standing layer of diamond film formed by chemical vapor deposition that is coupled to the at least one of the bearing shaft and cutter.

2. The earth-boring bit of claim 1, wherein:
the layer of diamond film is coupled to said at least one of the bearing shaft and cutter by brazing or soldering.

3. The earth-boring bit of claim 1, wherein:
the layer of diamond film has a thickness of between about 1 to 1000 microns.

4. The earth-boring bit of claim 1, wherein:
the at least one of the journal bearing surface and the mating bearing surface has a selected non-planer contoured geometry; and
the layer of diamond film is formed on a non-planer contoured substrate corresponding to the selected contoured geometry so that the layer of diamond film has the selected non-planer contoured geometry.

5. An earth-boring bit comprising:
a bit body;
a cantilevered bearing shaft depending from the bit body and including a generally cylindrical journal bearing surface, at least a portion of the journal bearing surface being formed from a free-standing layer of diamond film formed by chemical vapor deposition that is coupled to the bearing shaft; and
a cutter mounted for rotation on the bearing shaft, the cutter including a mating bearing surface for engagement with the journal bearing surface of the bearing shaft.

6. The earth-boring bit of claim 5, wherein:
the layer of diamond film is coupled to the bearing shaft by brazing or soldering.

7. The earth-boring bit of claim 5, wherein:
the layer of diamond film has a thickness of between about 1 to 1000 microns.

8. The earth-boring bit of claim 5, wherein:
the journal bearing surface has a selected contoured geometry; and
the layer of diamond film is formed on a contoured substrate corresponding to the selected contoured geometry so that the layer of diamond film has the selected contoured geometry.

9. The earth-boring bit of claim 5, wherein:
at least a portion of the mating bearing surface of the cutter is formed from a layer of free-standing diamond film.

10. The earth-boring bit of claim 5, wherein:
the entire journal bearing surface being formed from the free-standing layer of diamond film.

11. A method of forming an earth-boring bit comprising:
providing a bit body having a bearing shaft;
providing a cutter for rotatably mounting on the bearing shaft;
forming a free-standing layer of diamond film by chemical vapor deposition and then coupling the layer of diamond film to at least one of the bearing shaft body and the cutter so that the layer of diamond film forms a bearing surface of the at least one of the bearing shaft body and the cutter for engagement with a mating surface of the other of the at least one of the bearing shaft body and the cutter; and mounting the cutter on the bearing shaft so that the bearing surface engages the mating cutter surface with the cutter being rotatable about the bearing shaft.

12. The method of claim 11, wherein:
the layer of diamond film is coupled to the at least one of the bearing shaft and cutter by brazing or soldering.

13. The method of claim 11, wherein:
the layer of diamond film formed has a thickness of between about 1 to 1000 microns.

14. The method of claim 11, wherein:
the bearing surface has a selected non-planer contoured geometry;
the layer of diamond film is formed on a non-planer contoured substrate corresponding to the selected contoured geometry so that the layer of diamond film has the selected non-planer contoured geometry; and
the layer of diamond film is removed from the substrate prior to being coupled to the at least one of the bearing shaft body and cutter.

15. The method of claim 11, wherein:
the layer of diamond film is formed on a substrate having a selected surface configuration so that a facing surface of the layer of diamond film that interfaces with the substrate has a corresponding surface configuration.

16. The method of claim 11, wherein:
the bearing surface is on the bearing shaft.

* * * * *